US007900817B2

(12) United States Patent
Piersol et al.

(10) Patent No.: US 7,900,817 B2
(45) Date of Patent: Mar. 8, 2011

(54) TECHNIQUES FOR INTRODUCING DEVICES TO DEVICE FAMILIES WITH PAPER RECEIPT

(75) Inventors: Kurt Piersol, Campbell, CA (US); Peter E. Hart, Menlo Park, CA (US)

(73) Assignee: Ricoh Company, Ltd. (JP)

( * ) Notice: Subject to any disclaimer, the term of this patent is extended or adjusted under 35 U.S.C. 154(b) by 1358 days.

(21) Appl. No.: 11/342,263

(22) Filed: Jan. 26, 2006

(65) Prior Publication Data

US 2007/0170238 A1 Jul. 26, 2007

(51) Int. Cl.
*G06F 17/00* (2006.01)
(52) U.S. Cl. ....................................... 235/375
(58) Field of Classification Search ............. 235/375
See application file for complete search history.

(56) References Cited

U.S. PATENT DOCUMENTS

| | | | |
|---|---|---|---|
| 5,768,381 A | 6/1998 | Hawthorne | |
| 6,195,751 B1 | 2/2001 | Germano et al. | |
| 6,904,055 B2 | 6/2005 | Pichna et al. | |
| 7,278,572 B2 * | 10/2007 | Kim et al. | 235/386 |
| 7,451,116 B2 * | 11/2008 | Parmelee et al. | 705/50 |
| 2002/0019944 A1 * | 2/2002 | Kou | 713/200 |
| 2002/0023216 A1 | 2/2002 | Noguchi et al. | |
| 2003/0037033 A1 | 2/2003 | Nyman et al. | |
| 2003/0060168 A1 | 3/2003 | Teibel | |
| 2003/0139187 A1 | 7/2003 | Zhang et al. | |
| 2003/0149874 A1 | 8/2003 | Balfanz et al. | |
| 2003/0210787 A1 | 11/2003 | Billhartz et al. | |
| 2003/0210788 A1 | 11/2003 | Billhartz et al. | |
| 2003/0220765 A1 | 11/2003 | Overy et al. | |
| 2003/0226013 A1 | 12/2003 | Dutertre | |
| 2003/0233578 A1 | 12/2003 | Dutertre | |
| 2003/0235174 A1 | 12/2003 | Pichna et al. | |
| 2003/0235309 A1 | 12/2003 | Struik et al. | |
| 2004/0005058 A1 | 1/2004 | Jang et al. | |
| 2004/0015689 A1 | 1/2004 | Billhartz | |
| 2004/0053622 A1 | 3/2004 | Nakakita et al. | |
| 2004/0083368 A1 | 4/2004 | Gehrmann | |
| 2004/0179502 A1 | 9/2004 | Naghian | |
| 2004/0193538 A1 * | 9/2004 | Raines | 705/39 |
| 2004/0210484 A1 * | 10/2004 | Lee | 705/14 |

(Continued)

FOREIGN PATENT DOCUMENTS

EP 1315064 A1 5/2003

(Continued)

OTHER PUBLICATIONS

Steiner et al., "*Kerberos*: An Authentication Service for Open Network Systems," Mar. 30, 1988 (15 pages).

*Primary Examiner* — Daniel A Hess
*Assistant Examiner* — David Tardif
(74) *Attorney, Agent, or Firm* — Kilpatrick Townsend & Stockton LLP (57) ABSTRACT

Techniques for introducing devices to device families. Membership in a device family allows a device certain privileges such as the ability to engage in secure communications with another device in the same device family. A device is made a member of a device family by communicating to the device from a base station a ticket that is representative of the device family. The base station may also generate a paper receipt confirming the membership of the device in the device family.

31 Claims, 7 Drawing Sheets

U.S. PATENT DOCUMENTS

| | | |
|---|---|---|
| 2004/0228492 A1 | 11/2004 | Park |
| 2005/0031119 A1 | 2/2005 | Ding |
| 2005/0053045 A1 | 3/2005 | Chmora |
| 2005/0059379 A1 | 3/2005 | Sovio et al. |
| 2005/0076216 A1 | 4/2005 | Nyberg |
| 2005/0086533 A1* | 4/2005 | Hsieh .......................... 713/201 |
| 2005/0100166 A1 | 5/2005 | Smetters et al. |
| 2005/0123141 A1 | 6/2005 | Suzuki |
| 2005/0125664 A1 | 6/2005 | Berkema et al. |
| 2005/0271446 A1* | 12/2005 | Minowa ....................... 400/621 |
| 2006/0266829 A1* | 11/2006 | Bolton et al. ................. 235/386 |
| 2008/0235043 A1* | 9/2008 | Goulandris et al. .............. 705/1 |

FOREIGN PATENT DOCUMENTS

| | | |
|---|---|---|
| EP | 1379052 A2 | 1/2004 |
| EP | 1395019 A2 | 3/2004 |
| EP | 1458151 A1 | 9/2004 |
| EP | 1478156 A2 | 11/2004 |
| EP | 1516462 A2 | 3/2005 |
| JP | 2004/266342 A | 9/2004 |
| JP | 2004/304315 A | 10/2004 |
| WO | WO 99/48241 A1 | 9/1999 |
| WO | WO 02/15466 A1 | 2/2002 |
| WO | WO 02/063847 A2 | 8/2002 |
| WO | WO 03/017550 A2 | 2/2003 |
| WO | WO 03/077498 A1 | 9/2003 |
| WO | WO 03/084170 A1 | 10/2003 |
| WO | WO 03/100348 A1 | 12/2003 |
| WO | WO 2004/066536 A1 | 8/2004 |
| WO | WO 2004/102871 A1 | 11/2004 |
| WO | WO 2005/043808 A1 | 5/2005 |
| WO | WO 2005/057860 A1 | 6/2005 |

* cited by examiner

INFORMATION STORED BY DEVICE 500

| Family Name | Base Station Public Key | Ticket Contents | Key Phrase |
|---|---|---|---|
| Simplex Corp. Employees | AE69F38B2837EA83 | 83AD3B9853482 | gosimplex |
| AFLCIO Local 123 Members | F3278B340238E1F3A | D927364AEAE3F | workersunite |
| ... | ... | ... | ... |

INFORMATION STORED BY BASE STATION 600

| Family Name | Client Public Key | Ticket Contents | Key Phrase |
|---|---|---|---|
| Simplex Corp. Employees | 893BD3728DFDD234 | 83AD3B9853482 | gosimplex |
| AFLCIO Local 123 Members | 3BD892F1E3D45ACC | D927364AEAE3F | workersunite |
| ... | ... | ... | ... |

TECHNIQUES FOR INTRODUCING DEVICES TO DEVICE FAMILIES WITH PAPER RECEIPT

BACKGROUND OF THE INVENTION

The present invention relates to techniques for controlling functionality of devices and more particularly to techniques for enabling devices to be added to device families and for providing a tangible paper-based confirmation of the membership.

Recent years have seen a proliferation in the use of devices of different types including printers, cameras, copiers, scanners, facsimile machines, phones, various hand-held devices such as cellular phones, personal data assistants (PDAs), etc., and other types of devices. Enabling communication between these devices is an area of growing technological importance. With the advent of wireless communication, many of these devices communicate with each other using wireless communication protocols, although other communication protocols may also be used. With the growing emphasis on data integrity and security, it is often desired that communications between devices be performed in a secure manner. This is especially important in a wireless communication environment to prevent or make it difficult for eavesdroppers to listen in on wireless communication sessions.

Encryption schemes are typically used to ensure secure communications. These encryption schemes generally involve the use of encryption keys (e.g., public/private encryption keys). In order to enable secure communication between two devices, appropriate encryption keys are exchanged between the devices. These encryption keys are then used to enable secure communication between the devices. Generally, to enable secure communication between a pair of devices, each device is given one or more keys specific to the other device to enable communication with the other device. The process of choosing encryption keys which allows two devices to communicate is commonly referred to as device pairing, since each pair of devices is given a distinct set of keys to enable communication between the devices. A device generally has a distinct set of keys for each device with which the device wants to engage in secure communications.

Device pairing is feasible and works well for a small number of devices. However, since the number of pairings rises with the square of the number of devices, as the number of devices increases, the number of pairings rapidly increases and becomes unmanageable and impractical. For example, 4950 pairings are needed for 100 devices. Accordingly, if we envision an office with hundreds or even thousands of devices, the use of device pairings is no longer practical.

BRIEF SUMMARY OF THE INVENTION

Embodiments of the present invention provide techniques for introducing devices to device families. Membership in a device family allows a device certain privileges such as the ability to engage in secure communications with another device in the same device family. A device is made a member of a device family by communicating to the device from a base station a ticket that is representative of the device family. The base station may also generate a paper receipt confirming the membership of the device in the device family.

According to an embodiment of the present invention, techniques are provided for making a device a member of a device family. In one embodiment, a base station receives a request from a device to make the device a member of a device family. The base station generates a ticket for the device family based upon information associated with the device family, the ticket representative of membership of the device in the device family. The base station communicates the ticket from the base station to the device. The base station prints a paper receipt indicating membership of the device in the device family.

According to an embodiment of the present invention, the ticket may be regenerated using the paper receipt without using the base station. The paper receipt comprises printed information, wherein a portion of the printed information enables regeneration of the ticket independent of the base station.

According to an embodiment of the present invention, the base station generates the ticket for the device family by determining a key phrase associated with the device family and generating the ticket using the key phrase. In one embodiment, the base station communicates information associated with the device family to the device and receives from the device a partial ticket generated by the device by encrypting the information associated with the device family using a private key of the device. The base station encrypts the partial ticket received from the device using a private key of the base station to generate the ticket for the device family.

According to an embodiment of the present invention, the ticket enables the device to assert membership in the device family. In one embodiment, the ticket enables the device to assert membership in the device family to another device that is a member of the device family and to establish secure communications with the other device upon successful assertion of the membership.

Various information may be stored by the base station and the device. For example, the base station may store information related to the ticket, information identifying the device family, a public key of the device, and the information associated with the device family that is used to generate the ticket. Information stored by the device may include information related to the ticket, information identifying the device family, information identifying a public key of the base station, and the information associated with the device family that is used to generate the ticket. A portion of the information stored by the device may be regenerated using a paper receipt produced by the base station.

According to an embodiment of the present invention, techniques are provided for making a device a member of a device family. In one embodiment, a request is communicated from a first device to a base station requesting the first device to be made a member of a device family. The first device receives a ticket from the base station, the ticket generated by the base station for the device family using information associated with the device family, wherein the ticket is representative of membership of the first device in the device family. The first device may assert membership in the device family using the ticket.

According to one embodiment, the base station generates a paper receipt indicating membership of the first device in the device family. The ticket may be regenerated using the paper receipt, wherein the regeneration processing may be performed without using the base station.

According to an embodiment of the present invention, the first device receives information associated with the device family from the base station and generates a partial ticket by encrypting the information associated with the device family using a private key of the first device. The partial ticket is communicated to the base station. The first device receives, from the base station, the ticket for the device family, the ticket generated by the base station by encrypting the partial ticket received from the first device using a private key of the base station.

According to an embodiment of the present invention, the first device may determine if a second device is a member of the device family and enable communications between the first device and the second device if the second device is determined to be a member of the device family.

According to an embodiment of the present invention, the first device receives from the second device, a ticket stored by the second device for the device family and determines if the second device is a member of the device family based upon the ticket received from the second device. In one embodiment, the first device receives from the second device, a ticket stored by the second device for the device family. The first device decrypts the ticket received from the second device using a public key of the base station to produce a first result and decrypts the first result using a public key of the second device to produce a second result. The first device then determines that the second device is a member of the device family if the second result is same as the information associated with the device family that is used by the base station to generate the ticket received by the first device from the base station.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
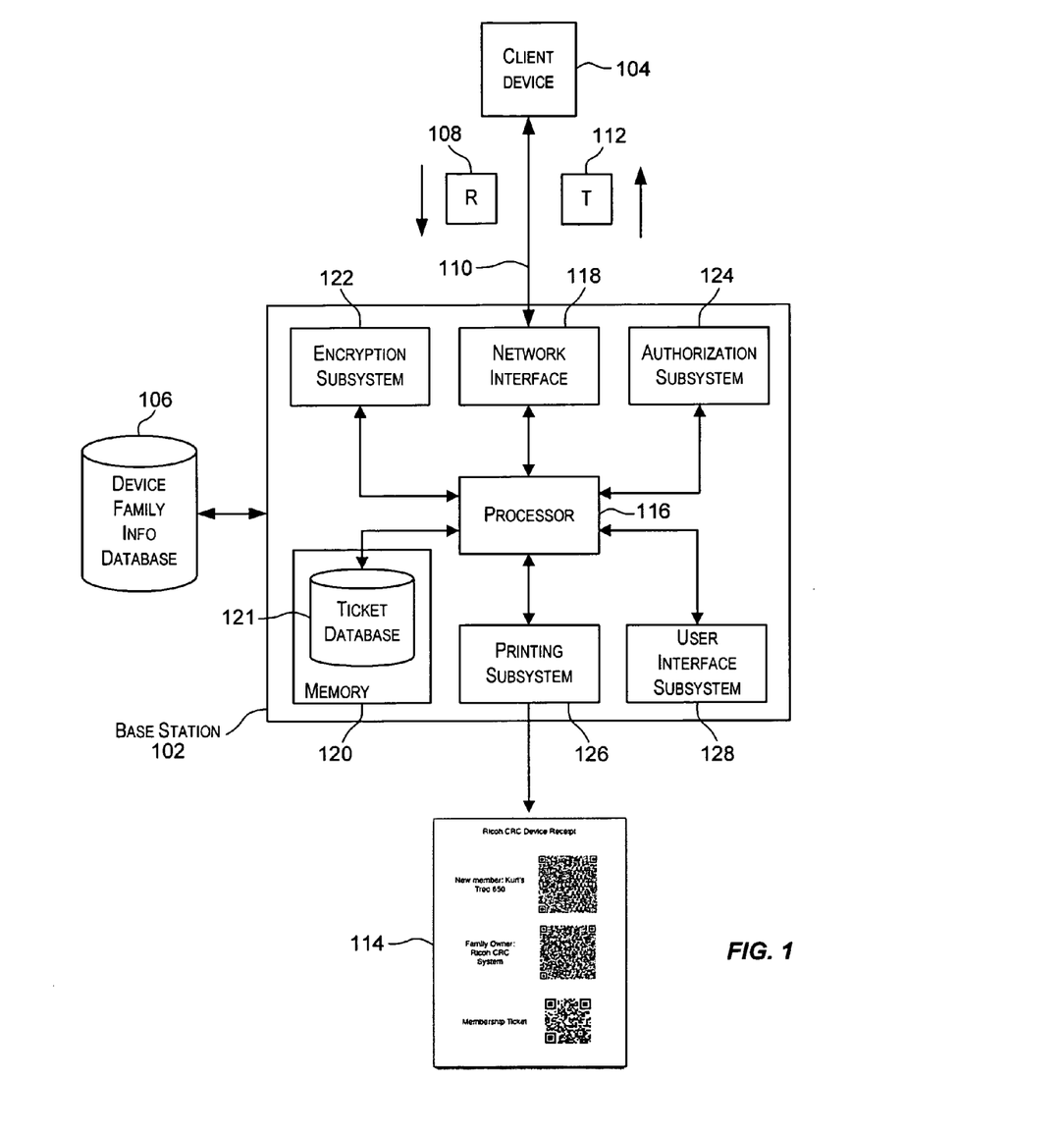
FIG. 1 is a simplified block diagram of a system that may incorporate an embodiment of the present invention.

Embodiments of the present invention provide techniques for introducing devices to device families. Membership in a device family allows a device certain privileges such as the ability to engage in secure communications with another device in the same device family. FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, system 100 includes a base station 102 that is configured to add devices 104 to device families. A device family is a classification that is generally identified by a device family identifier. Device families and their corresponding identifiers may be configured by a system administrator or by some other user. A device family may comprise zero or more devices. Information related to device families may be stored in a memory location accessible to base station 102. For example, the information may be stored in a database such as device family information database 106 that is accessible to base station 102. A device family may be independent of another device family. Alternatively, two or more of the device families may be related to one another via relationships that may be hierarchical in nature (e.g., parent child relationship between device families, wherein a device belonging to a parent device family may also be considered as belonging to the child device family, or alternatively, a device belonging to a child device family may also be considered as belonging to the parent device family). One device family may also contain another device family. For example, a first device family may contain a second device family. In this case, a device belonging to the second device family may also be considered to belong to the first device family. A device 104 may belong to one or more device families.

Base station 102 may receive a request 108 requesting that a device 104 be made a member of a particular device family. The request may be received from device 104 or from some other source. For example, a user of a device 104 may use the device to configure a request requesting that the device be added to a particular device family. The device family membership request 108 may then be communicated from device 104 to base station 102 via communication link 110. In other embodiments, membership request 108 may be automatically generated and communicated to base station 102 from a device 104. For example, the request may be automatically generated at device 104 and communicated from the device to base station 102 upon the occurrence of some event such as when the device and base station 102 are able to communicate with each other. For example, if a device 104 and base station 102 are able to communicate with each other wirelessly, the request may be automatically generated at the device and communicated to base station 102 when the device and base station 102 come within communication range. Various other events may also trigger the generation and communication of the membership request.

Communications between a device 104 and base station 102 may occur over a communication link 110 which may be a wired link or a wireless communication link or some other type of link that enables communication between the device and base station 102. Various different communication protocols may be used to facilitate communication between a device 104 and base station 102 over link 110.

Request 108 received by base station 102 from a device 104 may request that the device be made a member of one device family or even multiple device families. Information identifying the one or more device families to which a particular device is to be added may be specified in the membership request that is received by base station 102. In alternative embodiments, base station 102 may be configured to automatically determine the one or more families to which a device is to be added based upon information received in the membership request. For example, base station 102 may receive a membership request from a device including information describing one or more characteristics (e.g., device type, device serial number, etc.) of the sending device; base station 102 may be configured to determine the one or more device families to which the device is to be added based upon the device characteristics information. Various other techniques may also be used to determine the device family to which a device is to be made a member.

Base station 102 may also receive requests to remove a device from one or more device families to which the device has been previously added, i.e., to delete or revoke a device's membership in a device family. In certain instances, base station 102 may also unilaterally revoke a device's membership in a particular device family.

Base station 102 may perform various types of processing to service a membership request. For purposes of simplicity, it is assumed that the membership request requests that a device be made a member of a single device family, even though in alternative embodiments the membership request may request that the device be made a member of multiple device families. As part of the processing, base station 102 may perform authorization checks (e.g., perform checks to determine whether the device is permitted to become a member of the specified device family), perform encryption and/or decryption functions, exchange information with the device, and the like. According to an embodiment of the present invention, as part of the processing, base station 102 generates a ticket 112 that is communicated to the requesting device which may store the ticket for later use.

Ticket 112 is an electronic piece of data that is generated by base station 102 and communicated to a device. The terms "electronic ticket" and "ticket" are synonymous for purposes of this application. Base station 102 generates a ticket 112 for a particular device family to which the device is to be added. Generation of the ticket generally involves using information specific to the device family that is known to base station 102. Ticket 112 is thus representative of the device family to which a device is to be added. Ticket 112 may be encrypted. A ticket 112 generated for a particular device family is electronically communicated from base station 102 to the device requesting membership in the particular device family. A device receiving a ticket 112 may subsequently use the ticket to prove membership in the particular device family for which the ticket is generated. Tickets 112 are designed such that a ticket for a particular device family can only be generated by a base station in possession of some information (possibly secret information) associated with the particular device family. The tickets are generally not transferable—a ticket generated for a particular device will only work with that device—in other words the private key of the device must always match that used to generate the ticket.

A ticket received by a device for a device family enables a device to provide a public assertion of membership in the device family that cannot be forged. The tickets themselves are not encryption keys, nor are they secrets themselves. Membership in a device family may enable a device certain privileges such as being able to communicate with other devices in the same device family in a secure manner, access to certain documents, access to certain computation services, etc. Since a ticket enables a device to assert membership in a device family, the tickets are used as an access control mechanism for privileges associated with the membership. For example, two devices (such as two cellular phones) may exchange their respective tickets and based upon the tickets determine that they are members of the same device family.

As a result of this determination and due to membership in the device family, the devices may be allowed to communicate with each other in a secure manner. As a result, pairing of the two devices is performed based upon tickets received by the devices from a base station for the device family. In this manner, the devices are able to communicate with each other due to membership in a common device family.

The exchange of tickets and determination of common device family membership may be performed by the devices without any user intervention. Determination of membership may be performed independent of base station 102. For example, two devices may exchange their respective tickets and prove membership in a device family without access to base station 102. Device members of a device family may assemble and reassemble into groups at remote locations no matter which subset of devices are present.

In addition to generating an electronic ticket, upon successfully making a device a member of a particular device family, base station 102 is configured to print a receipt or token 114 on a paper medium. A paper medium may be any tangible medium on which information can be printed, written, drawn, imprinted, typed, and/or embossed. Examples include a sheet of paper, a plastic piece, etc. Accordingly, a paper receipt 114 may be printed by base station 102 for each ticket issued by base station 102. Paper receipt 114 confirms that the device has been made a member of the particular device family.

Paper receipt 114 may take various forms and may comprise various types of information. For example, paper receipt 114 may comprise information identifying the device that has been added to a device family and also information identifying the device family. Paper receipt 114 also comprises information that may be used to regenerate or reconstitute information that is used by a device to assert membership in a particular device family. For example, paper receipt 114 may comprise information that may be used to reconstitute a ticket generated for a device. Paper receipt 114 may also be used to reconstitute or regenerate other information that is used by a device to assert membership in a device family. The regeneration or reconstitution may be performed independent of base station 102. The regeneration processing may be performed by the device or some other data processing system.

The electronic tickets 112 generated by base station 102 are complemented by physical paper receipts 114 that are easily seen and managed. Paper receipt 114 provides a paper that provides a confirmation that the device has been introduced to a device family. Paper receipt generally comprises human-readable content. Paper receipt 114 is thus a tangible artifact providing the user (either the user of the device or some other user) a positive feedback loop, making the system more easily comprehensible. Various operations may be performed on or using paper receipt 114. For example, paper receipt 114 may be copied, scanned, faxed, etc. For example, an administrator may store the paper receipts generated by a base station to keep paper records of devices, tickets, and membership information.

Figure 7:
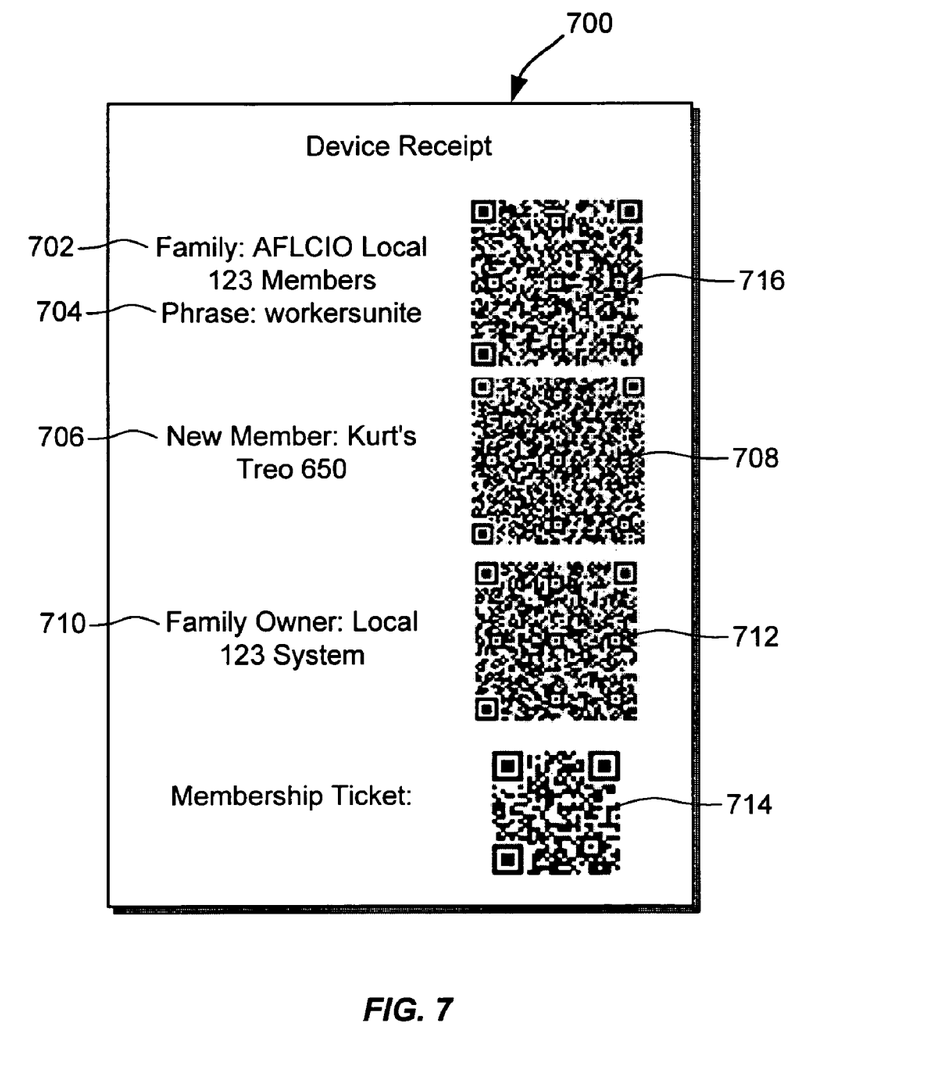
FIG. 7 depicts a simplified example of a paper receipt that may be generated by a base station upon issuing a ticket for a device according to an embodiment of the present invention.

As previously indicated, paper receipt 114 may comprise information that may be used to reconstitute a ticket and other information that is used by a device to assert membership in a device family. Further, this regeneration may be performed independent of base station 102. Paper receipt 114 may thus be used as backup, providing information that may be subsequently used to reconstitute information used by a device for device membership assertion. This may be useful and needed in several different circumstances. For example, the information, including the ticket, which is used by a device to assert membership in a particular device family is generally stored on the device. The device may however lose the information or portions thereof due to various reasons such as damage to the device, device memory corruption, loss of data, etc. In this situation, the information printed on a paper receipt 114 that was printed when the device became a member of the device family may be used to regenerate the lost information. In one embodiment, the information on the receipt may be scanned or read and provided to the device which may then reconstitute the lost information based upon the scanned/read information. Since this regenerated information may then used by the device to assert membership in a device family, reconstitution of this information in effect reestablishes membership of the device in the device family. An example of a paper receipt is depicted in FIG. 7 and described below.

FIG. 1 also depicts various subsystems and modules that provide the functionality of base station 102 according to an embodiment of the present invention. These subsystems or modules may be implemented in software, or hardware, or combinations thereof. The embodiment of base station 102 depicted in FIG. 1 is intended only as a specific example for purposes of illustrating the preferred embodiment of the computer system. Many other configurations having more or fewer components than the one depicted in FIG. 1 are possible.

As depicted in FIG. 1, base station 102 comprises a processor 116, a network interface 118, a memory subsystem 120, an encryption subsystem 122, an authorization subsystem 124, a printing subsystem 126, and a user interface subsystem 128. Processor 116 is configured to perform a majority of the processing performed by base station 102. Processor 116 may communicate with the other subsystems or modules via one or more bus systems.

Base station 102 communicates with client devices 104 using network interface 118. Network interface 118 may also provide an interface for communicating with other computer systems and networks. As previously described, the communication may be performed over wired or wireless links using one or more communication protocols.

Memory subsystem 120 provides storage for the programming and data constructs that provide the functionality of base station 102. For example, software (code modules or instructions) that provides the functionality of base station 102 may be stored in memory subsystem 120. These software modules or instructions may be executed by processor(s) 116. Memory subsystem 120 may include a number of memories including a main random access memory (RAM) for storage of instructions and data during program execution and a read only memory (ROM) in which fixed instructions are stored. Memory subsystem 120 may also provide a persistent (non-volatile) storage for program and data files, and may include a hard disk drive or other storage media. Memory subsystem 120 may also provide a drive for receiving associated removable media such as optical disks, memory cards, etc. In the embodiment depicted in FIG. 1, information related to electronic tickets generated by base station 102 may be stored in a ticket database 121 that is stored in memory subsystem 120. In alternative embodiments, ticket database 121 may be stored in some memory location accessible to base station 102.

Encryption system 122 is configured to perform tasks such encryption/decryption related tasks, exchange of encryption keys, and other tasks that are used to process membership requests. Encryption system 122 may use various different encryption techniques.

Authorization system 124 is configured to perform various authorization checks that may be performed as part of servicing a membership request received from a device to make the device a member of a device family. For example, upon receiving a membership request, base station 102 may request information from the user of the requesting device that is used for authorization purposes. Processing of the membership request may proceed only after successful authorization. Several different mechanisms may be provided to receive the information used for authorization. For example, upon receiving a membership request from a device, base station 102 may sound a beep to intimate the user of the device (or some administrator) that authorization information is needed in order to process the request. In one embodiment, authorization system 124 may comprise a biometric identification pad and the user may be prompted to place the user's thumb on the pad so that base station 102 can capture the thumbprint to be used for authorization. In other embodiments, authorization system 124 may include a radio frequency identifier (RFID) reader that is configured to read RFID tag information that is used for authorization and read from a RFID tag (the tag may be associated with the requesting device). Authorization system 124 may also comprise a numeric or alphanumeric keypad to enable a user to enter authorization information (e.g., password), a face recognizer (e.g., a camera) that is configured to capture a visual image of the face of the user and use the captured information for authorization, a voiceprint recognition system configured to capture audio information, or any other system that may be used to capture information that may be used for authorization.

Printing subsystem 126 is configured to generate paper receipts 114 by printing information on a paper medium. The paper medium may be any tangible medium on which information can be printed, written, drawn, imprinted, typed, and/or embossed. Printing the information on the paper medium may comprise printing, writing, drawing, imprinting, or embossing the information on the paper medium.

User interface subsystem 128 enables a user to input information to base station 102 and enables information to be output from base station 102. User interface subsystem 128 may include input tools such as keyboard, a mouse, trackball, touchpad, a scanner, a barcode scanner, a touch screen, audio input devices, and the like. User interface subsystem may include output tools such as a display, a printer, a fax machine, non-visual output displays such as audio output devices, and the like.

Base station 102 can be of various types including a personal computer, a portable computer, a workstation, a network computer, a mainframe, a kiosk, or any other data processing system. The description of base station 102 depicted in FIG. 1 is intended only as a specific example for purposes of illustrating the preferred embodiment of a base station. Many other configurations having more or fewer subsystems/components than the system depicted in FIG. 1 are possible. For example, printing subsystem 126 as shown in FIG. 1 is part of base station 102 however in an alternative embodiment base station 102 may be connected to an external printing device or system.

Figure 2:
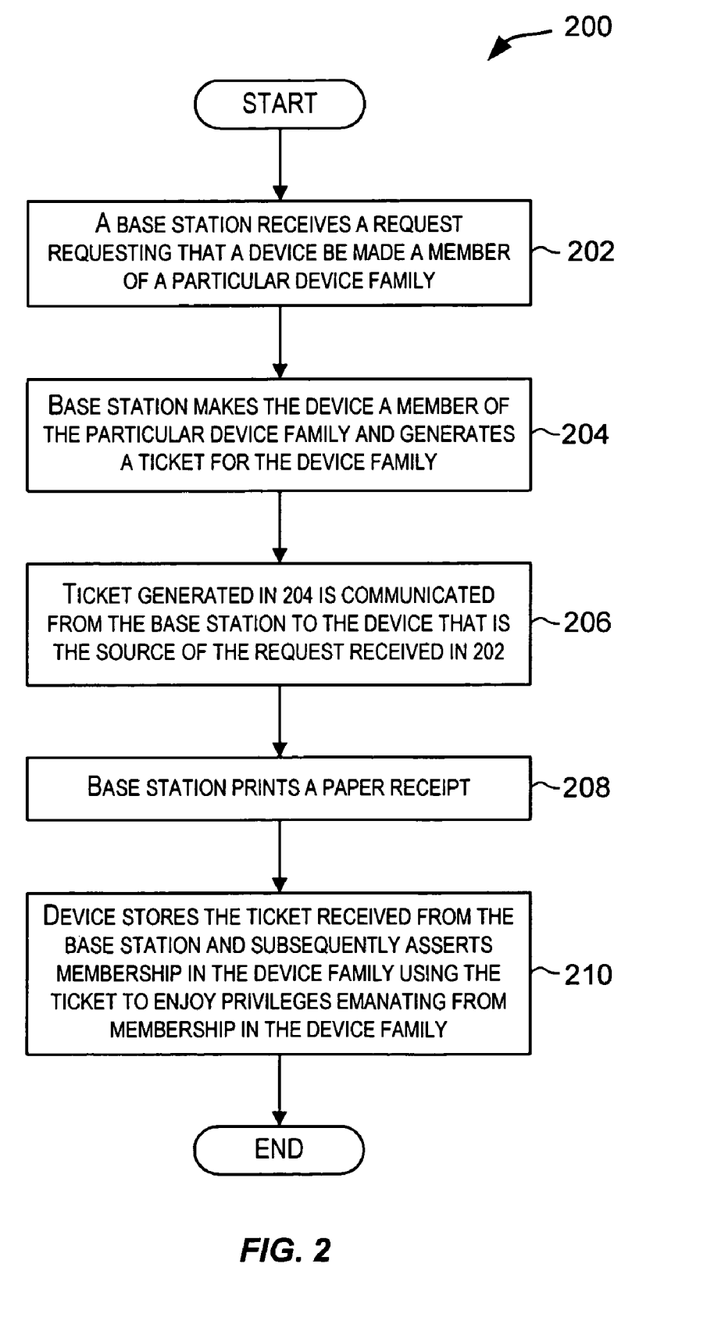
FIG. 2 is a simplified high-level flowchart depicting processing performed according to an embodiment of the present invention.

FIG. 2 is a simplified high-level flowchart 200 depicting processing performed according to an embodiment of the present invention. As depicted in FIG. 2, a base station 102 may receive a request requesting that a device be made a member of a particular device family (step 202). The request may be received in various ways. For example, a user of a device may configure a request using a device and the request may then be communicated from the device to base station 102. The request received in 202 may take various forms. For example, in one embodiment, the request may be in the form of requesting a ticket for a particular device family since the effect of requesting a ticket for a device family in effect requests that a device be made a member of the device family.

Base station 102 may then make the device a member of the specified device family and generate a ticket for the device family (step 204). Base station 102 may generate the ticket based upon information associated with the device family and known to base station 102. Various authorization procedures may or may not be performed as part of 204. The electronic ticket generated in 204 is then communicated from the base station to the requesting device that is the source of the request received in 202 (step 206).

Base station 102 also prints a paper receipt (step 208). The paper receipt confirms that the device is a member of the particular device family. The paper receipt may comprise various types of information including information that may be used to reconstitute the ticket generated in 204 independent of base station 102. The paper receipt may be provided to the user of the requesting device or some other user such as the administrator of base station 102. The device may store the ticket received from base station 102 and subsequently assert membership in the device family using the ticket and enjoy privileges emanating from membership in the device family (step 210). For example, in one embodiment, the device may use the ticket to pair up with another device. In this example, upon successful assertion of common device family membership by both the devices, as part of the privileges of membership in the device family, the two devices may be allowed to continue to communicate with each other, possibly in a secure manner.

Figure 3:
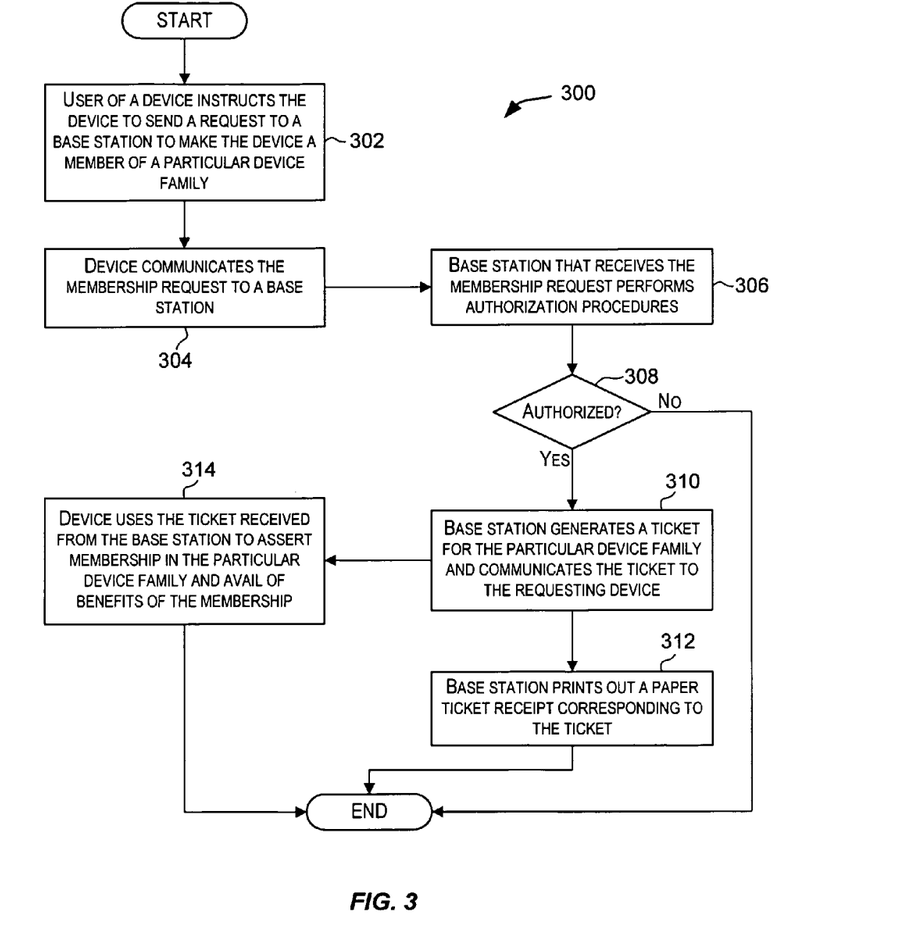
FIG. 3 is a simplified flowchart depicting high-level processing performed by a base station and a device according to an embodiment of the present invention.

FIG. 3 is a simplified flowchart 300 depicting high-level processing performed by a base station 102 and a device 104 according to an embodiment of the present invention. The method depicted in FIG. 3 may be performed by software (code modules or instructions) executed by the base station and the device, hardware modules of the base station or device, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints. For purposes of simplicity, it is assumed in the following description that the device is being added to a single device family. A device may however request to be made a member of multiple device families.

As depicted in FIG. 3, processing may be initiated when a user of a device instructs the device to send a request to a base station to make the device a member of a particular device family (step 302). The request may be in the form of a request to obtain a ticket for a particular device family from a base station, since the effect of this is the same as requesting membership in a device family.

The device may then communicate the membership request to a base station 102 (step 304). The request may be communicated to a base station that is configured to process requests for the particular device family identified in the request. The base station 102 that receives the request may then perform various authentication or authorization procedures to determine if the membership request should be processed (step 306). As part of 306, base station 102 may determine if the requesting device or user is authorized to receive a ticket that may be used by the device to assert membership in the particular device family (i.e., whether the device or user is allowed to be a member of the requested device family). As previously described, various different techniques (e.g., fingerprint check, face recognition techniques, password verification) may be used to perform authorization. Authorization procedures are used to control the devices that are made members of device families and limit the issuing of tickets.

A check is then made to determine if authorization is successful (step 308). If authorization is not successful, i.e., the authentication and authorization procedures are not successfully navigated, then processing is terminated. In this situation no ticket is issued and the device is not made a member of the requested device family. Information may be output to the user identifying the reasons for the failure.

If it is determined in 308 that authorization is successful, i.e., the authentication and authorization procedures are successfully navigated, then base station 102 generates a ticket for the particular device family and communicates the ticket to the requesting device (step 310). Generation of the ticket implies that the device has been made a member of the particular device family. Base station 102 may generate the ticket based upon information associated with the particular device family that is known to or accessible to base station 102. Base station 102 also prints out a paper ticket receipt corresponding to the ticket (step 312). The paper receipt printed in 312 confirms that the device is a member of the particular device family and may also comprise information that may be used to regenerate the ticket independent of base station 102.

The device may then use the ticket received from base station 102 to assert membership in the particular device family and avail of benefits of the membership (step 314).

Figure 4:
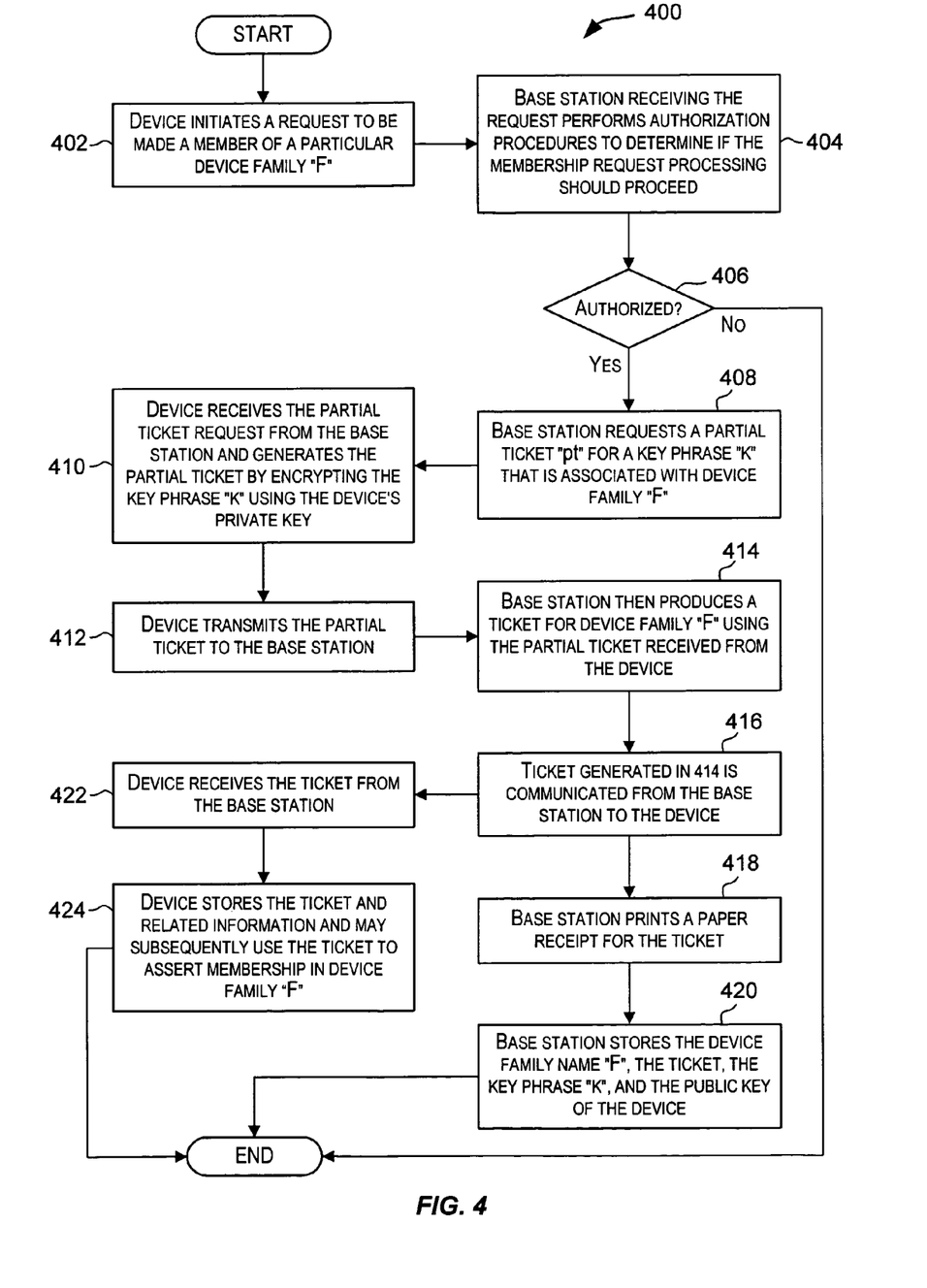
FIG. 4 is a simplified high-level flowchart depicting processing performed by a base station and a device according to an embodiment of the present invention.

FIG. 4 is a simplified high-level flowchart 400 depicting processing performed by a base station 102 and a device 104 according to an embodiment of the present invention. The method depicted in FIG. 4 may be performed by software (code modules or instructions) executed by the base station and device, hardware modules of the base station or device, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints. It is assumed in the following description that the device is being added to a single device family. A device may however be added to multiple device families in alternative embodiments.

As depicted in FIG. 4, processing may be initiated when a device initiates a request to be made a member of a particular device family "F" (step 402). The request initiated in 402 may be a request for a ticket for the particular device family since this in effect is the same as requesting membership in the device family.

Upon receiving the request from the device, the base station performs authorization procedures to determine if the membership request processing should proceed (step 404). For example, the base station may determine if the requesting device is authorized to request addition to device family "F", whether the device is permitted to become a member of device family "F", etc. Various types of information may be collected in 404 to determine if processing of the membership request is authorized. A check is then made to determine if authorization is successful (step 406). If authorization is not successful, then processing is terminated. If authorization is successful, then processing continues with step 408.

Each device has a public/private key pair, public key $PB_D$ and private key $PV_D$. The base station also has a public/private key pair, public key $PB_B$ and private key $PV_B$. These key pairs may be used to implement an asymmetric encryption technique according to an embodiment of the present invention. Upon successful authorization in 406, the base station requests a partial ticket "pt" for a key phrase "k" that is associated with device family "F" (step 408). Key phrase "k" represents information that is specific to device family "F" and that is known to the base station. Key phrase "k" may be a combination of letters, numerals, symbols, etc. Information identifying device families and key phrases specific to the device families may be stored in a memory location accessible to the base station such as in device family information database 106 depicted in FIG. 1. Information identifying key phrase "k" for device family "F" may be sent to the device as part of the partial ticket request.

The device receives the partial ticket request from the base station and generates the partial ticket by encrypting the key phrase "k" using the device's private key $PV_D$ (step 410). The partial ticket is information that is generated by the device based upon the key phrase "k" associated with the device family. The partial ticket may be generated as follows in one embodiment:

$$pt=\text{encrypt}(k, PV_D)$$

Accordingly, the partial ticket "pt" is the result of encrypting key phrase "k" using the private key of the device ($PV_D$). The device then transmits the partial ticket to the base station (step 412).

The base station then produces a ticket "$t_f$" for device family "F" using the partial ticket received from the device (step 414). According to an embodiment of the present invention, the ticket "$t_f$" is generated by encrypting the partial ticket "pt" received from the device using the private key ($PV_B$) of the base station. This may be represented as follows:

$$t_f=\text{encrypt}(pt, PV_B)$$

Thus, according to an embodiment of the present invention, the ticket is generated by encrypting the key phrase "k" associated with the device family with both the private key of the device ($PV_D$) and the base station private key ($PV_B$).

The generated ticket is then communicated from the base station to the device (step 416). The base station then prints a paper receipt for the ticket (step 418). The base station stores the device family name "F", the ticket $t_f$, the key phrase "k", and the public key of the device ($PB_D$) (step 420). The information may be stored in a database such as ticket database 121 depicted in FIG. 1.

The device receives the ticket from the base station (step 422). The device then stores device family name "F", the ticket $t_f$, the key phrase "k", and the public key of the base station ($PB_B$) in a memory on the device (step 424). For example, the information may be stored on a database on the device. This stored information may then be used by the device to assert membership in a particular device family. The public key ($PB_B$) of the base station may be received by the device in step 410 or 422 or in some other step. It is generally assumed that the public key of any device or base station is available upon request at any time.

A device can be a member of many device families and have a ticket and other information stored for each device family membership. For each device family of which the device is a member, the device may store information corresponding to the membership in the device family. In one embodiment, for each device family of which the device is a member, the device may store a triplet comprising (ticket, base station public key, device family identifier). The ticket corresponds to the ticket received when the device became a member of the device family. The "base station public key" is the public key of the base station that generated the ticket. The "device family identifier" is an identifier for the device family. The device may also store the key phrase associated with the device family. The stored information, including the ticket information, may be used by the device to assert membership in the corresponding device family and avail of benefits/privileges emanating from the membership.

Figure 5:
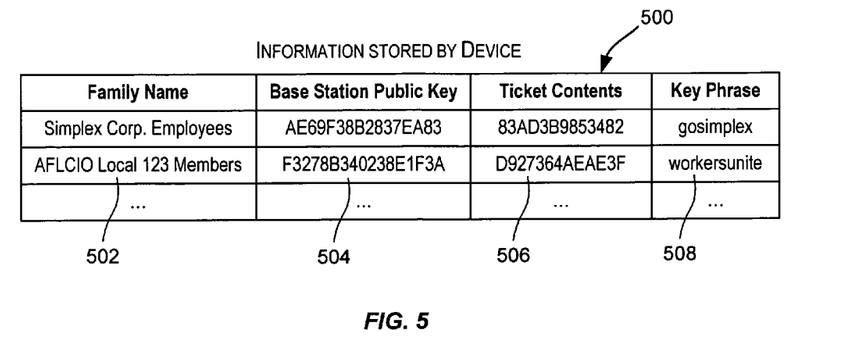
FIG. 5 depicts a portion of information that may be stored by a device according to an embodiment of the present invention.

FIG. 5 depicts a portion of information that may be stored by the device according to an embodiment of the present invention. As shown in FIG. 5, a table 500 is stored comprising four columns. Each row of the table corresponds to information stored for a ticket received by the device. Accordingly, each row represents information stored by the device for membership in a particular device family. The information in each row comprises an identifier 502 identifying the device family which the device has been made a member of and for which the device has received a ticket, a public key 504 of the base station that issued the ticket, ticket contents 506, and the key phrase 508 for the device family used in the ticket generation. Other information may be stored in alternative embodiments.

Figure 6:
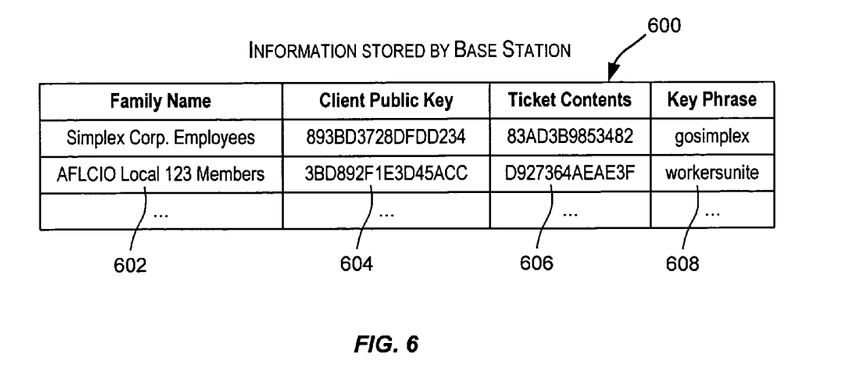
FIG. 6 depicts a portion of information that may be stored by a base station according to an embodiment of the present invention.

FIG. 6 depicts a portion of information that may be stored by a base station according to an embodiment of the present invention. As shown in FIG. 6, a table 600 is stored comprising four columns. Each row of the table corresponds to information stored for a ticket issued by the base station. The information in each row comprises an identifier 602 identifying a device family for which the ticket was generated, a public key 604 of a client device which was made a member of the device family and to which the ticket was issued, ticket contents 606, and the key phrase 508 for the device family used in the ticket generation. Other information may be stored in alternative embodiments.

FIG. 7 depicts a simplified example of a paper receipt 700 that may be generated by a base station upon issuing a ticket for a device according to an embodiment of the present invention. The receipt depicted in FIG. 7 is merely an example of a receipt and is not intended to limit the scope of the present invention. Different formats and layouts may be used in alternative embodiments. The contents printed on the receipt may also be different in different embodiments.

Paper receipt 700 comprises information 702 identifying the device family to which the device was added and the device family for which a ticket was issued to the device. In FIG. 7, the device family is identified by identifier "AFLCIO Local 123 Members". Information 704 is also printed identifying a key phrase associated with the device family that is used for generation of the ticket. In FIG. 7, the key phrase associated with device family "AFLCIO Local 123 Members" is "workersunite". Information 706 identifying the device that was made a member of the device family is printed. Information 706 may comprise information such as the name of the device, a device identifier, device model information, device manufacturer information, and the like. In the embodiment depicted in FIG. 7, the device is a PDA identified by identifier "Kurt's Treo 650". Information 710 identifying a base station that issued the ticket may also be printed. In FIG. 7, the base station is "Local 123 System".

As depicted in FIG. 7, one or more machine-readable representations may be printed on paper receipt 700. For example, a machine-readable representation 708 of the public key of the device ($PB_D$) is printed on paper receipt 700. A machine-readable representation 712 of the public key of the base station ($PB_B$) is also printed. Machine-readable representation 714 printed on receipt 700 stores information representing the identity of the device family, including the name of the device family and the key phrase associated with the device family. Accordingly, machine-readable representation 714 encapsulates information stored in columns 502 and 508 of table 500 depicted in FIG. 5. Machine-readable representation 716 printed on receipt 700 encapsulates contents of the specific ticket that allows a specific device to prove membership in a device family noted by 714.

The information printed on paper receipt 700 may be used by a device to regenerate information that is used by a device to assert membership in a device family. For example, the information depicted in table 500 that is stored by a device may be reconstituted or regenerated using the information printed on paper receipt 700. Paper receipt 700 may be used to reconstitute information for a row of table 700. In one embodiment, the information may be regenerated by scanning and decoding the machine-readable representations printed on paper receipt 700. If the representations are in the form of barcodes, a barcode reader may be used to read the representations. Information identifying a device family (e.g., information stored in column 502 of table 500) and a key phrase for the device family (information stored in column 508 of table 500) may be regenerated by scanning and decoding machine-readable representation 714. The ticket contents (information stored in column 506 of table 500) may be regenerated by scanning and decoding machine-readable representation 716. The public key of the base station (information stored in column 504 of table 500) may be regenerated by scanning and decoding machine-readable representation 712. The information in column 504 may also be generally available to the device.

The regeneration or reconstitution of information from the paper receipt may be performed by a device without needing the services of a base station, i.e., independent of the base station. The processing may be performed by the device or some other data processing system.

As previously described, a base station is configured to print a paper receipt, such as paper receipt 700 depicted in FIG. 7, each time that a device is made a member of a device family and a ticket issued to the device. The printed paper receipt provides a user a human-readable tangible artifact confirming membership of the device in the device family. The paper receipt may subsequently be used as a physical token to assert membership in a particular device family. Paper receipts may be used for a variety or purposes such as filing and other administrative functions. For example, paper receipts printed by a base station may be organized and archived and may be used to determine information such as the devices that have been added to one or more device families, the device families to which individual devices have been added, membership in any device family, and the like. A paper receipt may be copied, scanned, faxed, etc.

As depicted in FIG. 7 and described above, a paper receipt may comprise various types of information. A portion of the information printed on a paper receipt may be used to reconstitute information used by a device to assert membership in a device family without needing the services of a base station. Accordingly, a paper receipt provides a recovery tool for regenerating information used for asserting device family membership. Thus, even if a device loses information stored in table 500 or a portion thereof, the paper receipt provides a recovery tool that enables regeneration of the requisite information that enables a device to once again assert membership in a device family, in effect enabling the device to reestablish membership in the device family.

A paper receipt may also be used to reconstitute information stored at a base station. For example, portions of information stored in table 600 depicted in FIG. 6 may be reconstituted using a paper receipt.

Figure 8:
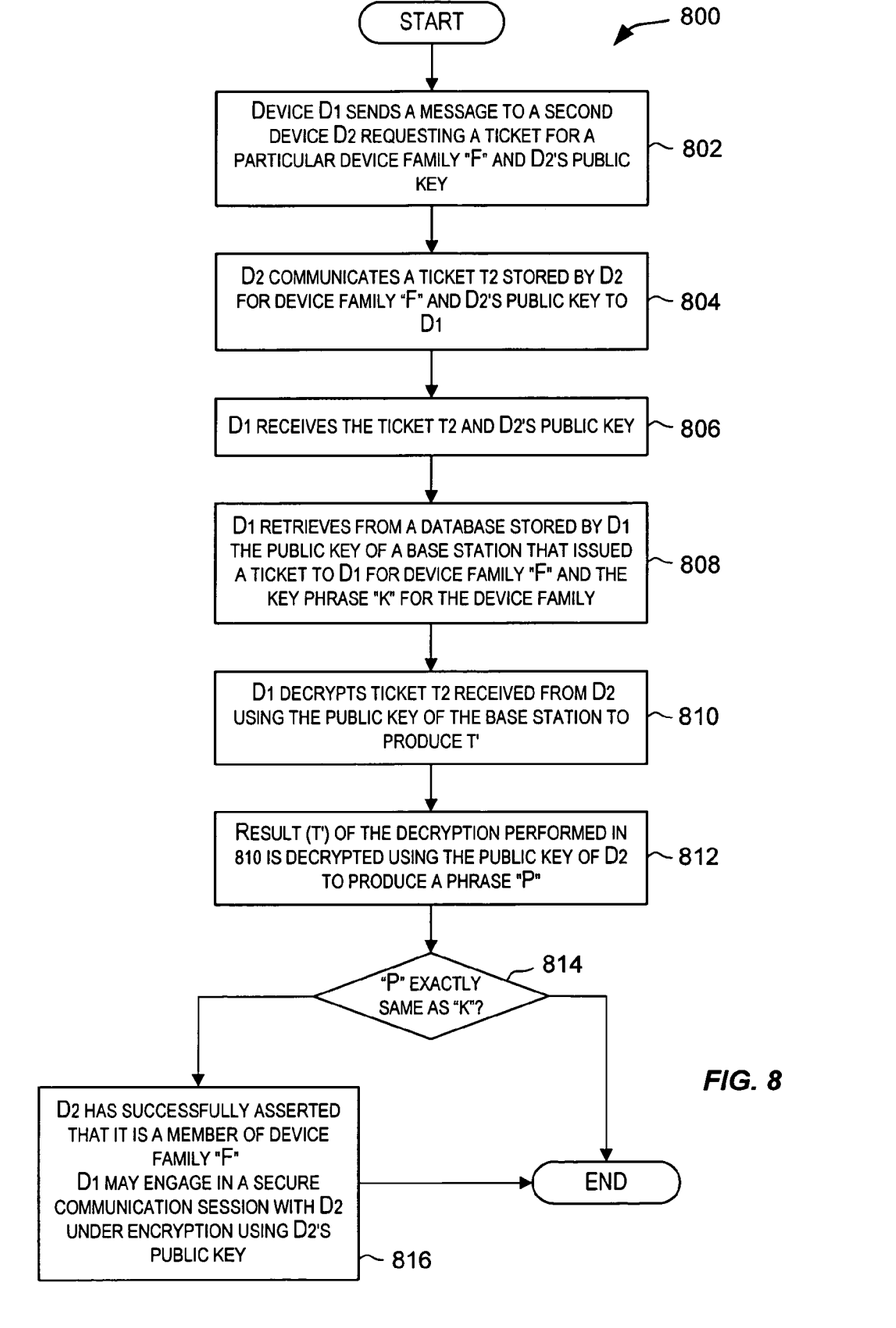
FIG. 8 is a simplified high-level flowchart depicting processing performed for pairing two devices based upon their device family membership according to an embodiment of the present invention.

Membership in a device family may entitle a device to various benefits and privileges. For example, a device that is a member of a particular device family may pair up with another device from the same device family and engage in communications with the other device. FIG. 8 is a simplified high-level flowchart 800 depicting processing performed for pairing two devices based upon their device family membership according to an embodiment of the present invention. The method depicted in FIG. 8 may be performed by software (code modules or instructions) executed by the devices and/or hardware modules of the two devices. Flowchart 800 depicted in FIG. 8 is merely illustrative of an embodiment of the present invention and is not intended to limit the scope of the present invention. Other variations, modifications, and alternatives are also within the scope of the present invention. The method depicted in FIG. 8 may be adapted to work with different implementation constraints.

The processing depicted in FIG. 8 may be initiated when a first device wishes to establish a to establish a secure communication channel with a second device. In one embodiment, this may occur upon occurrence of an event such as which the first device detects the presence of a second device with which the first device would like to communicate with in a secure manner. For example, a first cellular phone may detect the presence of another cellular phone when the two cellular phones come within communication range of each other. The processing depicted in FIG. 8 may be automatically invoked by the first cellular phone. In alternative embodiments, the processing depicted in FIG. 8 may also be initiated by a user of a device. For example, a user of a PDA may want to communicate with a particular device such as a camera, possibly to download/upload pictures from the camera. In this instance, the user of the PDA may cause the PDA to initiate processing depicted in FIG. 8 in order to enable secure communications with the camera. The communication link between the devices may be over a wireless communication link, a wired communication link, or some other communication link that enables the devices to communicate with each other.

As depicted in FIG. 8, the first device (D1) may send a message to the second device (D2) requesting a ticket for a particular device family "F" and D2's public key (step 802). If D2 is interested in enabling secure communication with D1, then D2 may communicate a ticket (t2), if any, stored by D2 for the particular device family "F" and D2's public key ($PB_{D2}$) to D1 (step 804). D1 then receives the ticket t2 and D2's public key $PB_{D2}$ (step 806).

D1 may then retrieve from a database stored by D1 the public key ($PB_B$) of a base station that issued a ticket to D1 for the particular device family "F" and the key phrase "k" for the device family (step 808). For example, for table 500 depicted in FIG. 5, D1 may determine a row in the table corresponding to the device family "F" and determine a public key ($PB_B$) (504) of the base station that generated the ticket for family and the key phrase (508) for the device family. D1 then decrypts ticket t2 received from D2 using the public key $PB_B$ of the base station to produce t' (step 810). The decryption in 810 may be performed as follows:

$$t' = \text{decrypt}(t2, PB_B)$$

The result (t') of the decryption performed in 810 is decrypted by D1 using the public key of D2 to produce a phrase "P" (step 812). The decryption in 812 may be performed as follows:

$$P = \text{decrypt}(t', PB_{D2})$$

The processing performed in 810 and 812 may be performed in a single step wherein decryption may be performed as follows:

$$P = \text{decrypt}(\text{decrypt}(t2, PB_B), PB_{D2})$$

indicating that first t2 is decrypted using $PB_B$ and the result of that decryption operation is further decrypted using $PB_{D2}$.

A check is then made to determine if P is exactly the same as "k" associated with the device family (step 814). If P is exactly the same as "k", then D2 has successfully asserted that it is a member of the particular device family "F". D1 may then continue and engage in a secure communication session with D2 under encryption using D2's public key $PB_{D2}$ (step 816). If however it is determined in 814 that P is not exactly the same as "k", then D2 has failed to assert membership in device family "F". In this situation, D1 may not communicate with D2. D2 may also perform the processing depicted in FIG. 8 to ensure that D1 is a member of the same device family before enabling the communication with D1.

As described, the devices may perform processing to determine that they both belong to the same device family. Once the devices have mutually proved membership, they can safely communicate using standard encryption methods. Key phrase "k" is not a secret, nor are the contents of ticket t2. Only the private keys of the devices are secret. In this manner, two or more devices can pair up based upon device family membership. This pairing can be achieved without needing a base station. Device family members can prove membership without access to the base station, allowing them to reassemble into groups at remote locations, no matter which subset of devices is present.

A base station may also be able to revoke tickets that have been issued to one or more devices, in effect revoking the device's membership in a device family. In one embodiment, the revocation may be performed by the base station by sending a revocation message to a device to revoke the ticket for a particular device family. The revocation message may be a combination of a revoke command and the public key of the device whose ticket is to be revoked. The revocation message may be encrypted with the private key of the base station to prevent forgery. According to an embodiment of the present invention, such a revocation may be passed from each device to any others of the same device family that it meets. Such a system may assume that only a small number of revocations will occur over time. Each device may store an exception list listing devices whose tickets have been revoked and would refuse to pair with any device on the exception list.

Device tickets may also expire in certain embodiments. Such tickets would have an expiration time associated with them during ticket generation. In such embodiments, in order to prevent membership in a device family for a device from lapsing, a base station may periodically generate update tickets that may be carried from one device to another, without loss of device family security. The base station may periodically update tickets and transmit them to any number of devices via rumor propagation.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of making a device a member of a device family, the method comprising:
    receiving, at a base station, a request to make a device a member of a device family, the device family having two or more devices;
    generating, at the base station, a ticket for the device family based upon information associated with the device family, the ticket including information indicating the device family that the device is a member of;
    communicating the ticket from the base station to the device; and
    printing, at the base station, a paper receipt indicating membership of the device in the device family.

2. The method of claim 1 further comprising:
    regenerating the ticket using the paper receipt, wherein the regenerating is performed without using the base station.

3. The method of claim 1 wherein the paper receipt comprises printed information comprising information identifying the device, information identifying the device family, and a representation of the ticket, wherein a portion of the printed information enables regeneration of the ticket independent of the base station.

4. The method of claim 1 wherein generating the ticket for the device family comprises:
    determining, at the base station, a key phrase associated with the device family; and
    generating the ticket at the base station using the key phrase.

5. The method of claim 1 wherein generating the ticket for the device family comprises:
    communicating the information associated with the device family from the base station to the device;
    receiving, at the base station from the device, a partial ticket generated by the device by encrypting the information associated with the device family using a private key of the device; and
    encrypting, at the base station, the partial ticket received from the device using a private key of the base station to generate the ticket for the device family.

6. The method of claim 1 wherein the ticket enables the device to assert membership in the device family.

7. The method of claim 1 wherein the ticket enables the device to assert membership in the device family to another device that is a member of the device family and to establish secure communications with the another device upon successful assertion of the membership.

8. The method of claim 1 further comprising:
    storing, at the base station, information related to the ticket, information identifying the device family, a public key of the device, and the information associated with the device family that is used to generate the ticket.

9. A method of making a device a member of a device family, the method comprising:
    communicating a request from a first device to a base station requesting the first device to be made a member of a device family, wherein the device family includes two or more devices;

receiving, at the first device, a ticket from the base station, the ticket generated by the base station for the device family using information associated with the device family, wherein the ticket includes information indicating the device family of which the first device is a member;

the first device asserting membership in the device family using the ticket; and generating a paper receipt at the base station, the paper receipt indicating membership of the first device in the device family.

10. The method of claim 9 further comprising:
regenerating the ticket using the paper receipt, wherein the regenerating is performed without using the base station.

11. The method of claim 9 wherein receiving the ticket from the base station comprises:
receiving the information associated with the device family at the first device from the base station;
generating a partial ticket at the first device by encrypting the information associated with the device family using a private key of the first device;
communicating the partial ticket to the base station; and
receiving, from the base station, the ticket for the device family, the ticket generated by the base station by encrypting the partial ticket received from the first device using a private key of the base station.

12. The method of claim 9 further comprising:
storing, at the first device, information related to the ticket, information identifying the device family, information identifying a public key of the base station, and the information associated with the device family that is used to generate the ticket.

13. The method of claim 12 further comprising:
regenerating a portion of the information stored by the first device using a paper receipt generated by the base station.

14. The method of claim 9 further comprising:
determining whether a second device is a member of the device family; and
enabling communications between the first device and the second device upon determining that the second device is a member of the device family.

15. The method of claim 14 wherein determining whether the second device is a member of the device family comprises:
receiving, at the first device from the second device, a ticket stored by the second device for the device family; and
determining whether the second device is a member of the device family based upon the ticket received from the second device.

16. The method of claim 14 wherein determining whether the second device is a member of the device family comprises:
receiving, at the first device from the second device, a ticket stored by the second device for the device family;
decrypting, at the first device, the ticket received from the second device using a public key of the base station to produce a first result;
decrypting, at the first device, the first result using a public key of the second device to produce a second result; and
determining that the second device is a member of the device family upon determining that the second result is same as the information associated with the device family that is used by the base station to generate the ticket received by the first device from the base station.

17. A system comprising:
a communication module;
a processor; and
a printing module;
wherein the communication module is configured to receive a request from a device to make the device a member of a device family, the device family including two or more devices;
wherein the processor is configured to generate a ticket responsive to the request, the ticket generated based upon information associated with the device family, wherein the ticket includes information indicative of the device family of which the device is a member of;
wherein the communication module is configured to communicate the ticket to the device; and
wherein the printing module is configured to print a paper receipt including the information about the device family of which the device is a member.

18. The system of claim 17 further comprising:
a second processor configured to regenerate the ticket using the paper receipt.

19. The system of claim 17 wherein the paper receipt comprises printed information comprising information identifying the device, information identifying the device family, and a representation of the ticket, wherein a portion of the printed information enables regeneration of the ticket.

20. The system of claim 17 further comprising:
a memory storing information identifying a set of one or more device families and a key phrase associated with each device family;
wherein the processor is configured to:
determine, from the memory, a key phrase associated with the device family; and
generate the ticket using the key phrase.

21. The system of claim 17 wherein:
the communication module is configured to:
communicate the information associated with the device family to the device; and
receive a partial ticket generated by the device by encrypting the information associated with the device family using a private key of the device; and
wherein the processor is configured to encrypt the partial ticket received from the device using a private key of the system to generate the ticket for the device family.

22. The system of claim 17 wherein the ticket enables the device to assert membership in the device family and to use privilege arising from the membership.

23. The system of claim 17 further comprising:
a memory storing information related to the ticket, information identifying the device family, a public key of the device, and the information associated with the device family that is used to generate the ticket.

24. A system comprising:
a base station; and
a first device;
wherein the base station:
receives a request from the first device to become a member of a device family, wherein the device family includes two or more devices;
generates a ticket in response to the request, the ticket generated based upon information associated with the device family accessible to the base station, the ticket indicating the device family of which the first device is a member of;
communicates the ticket to the first device; and
prints a paper receipt indicating membership of the first device in the device family.

25. The system of claim 24 wherein the first device regenerates the ticket using the paper receipt, wherein the regenerating is performed without using the base station.

26. The system of claim 24 wherein:
the base station communicates the information associated with the device family to the first device;
the first device generates a partial ticket by encrypting the information associated with the device family using a private key of the first device and communicates the partial ticket to the base station; and
the base station generates the ticket by encrypting the partial ticket received from the first device using a private key of the base station.

27. The system of claim 24 wherein:
the first device stores information related to the ticket, information identifying the device family, information identifying a public key of the base station, and the information associated with the device family that is used to generate the ticket.

28. The system of claim 27 wherein the first device regenerates a portion of the information stored by the first device using a paper receipt generated by the base station.

29. The system of claim 24 wherein the first device:
determines whether a second device is a member of the device family; and
enables communications between the first device and the second device upon determining that the second device is a member of the device family.

30. The system of claim 29 wherein the first device:
receives, from the second device, a ticket stored by the second device for the device family; and
determines whether the second device is a member of the device family based upon the ticket received from the second device.

31. The system of claim 29 wherein the first device:
receives, from the second device, a ticket stored by the second device for the device family;
decrypts the ticket received from the second device using a public key of the base station to produce a first result;
decrypts the first result using a public key of the second device to produce a second result; and
determines that the second device is a member of the device family upon determining that the second result is same as the information associated with the device family that is used by the base station to generate the ticket received by the first device from the base station.

* * * * *